No. 652,961. Patented July 3, 1900.
O. F. GARVEY.
AUTOMATIC MACHINE CHUCK.
(Application filed Dec. 29, 1899.)
(No Model.)
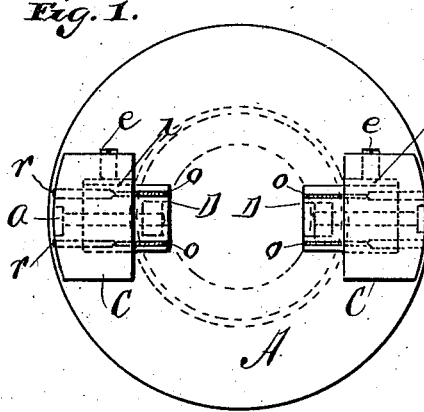
Fig. 1.
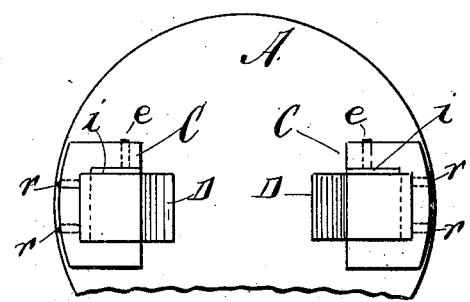
Fig. 5.
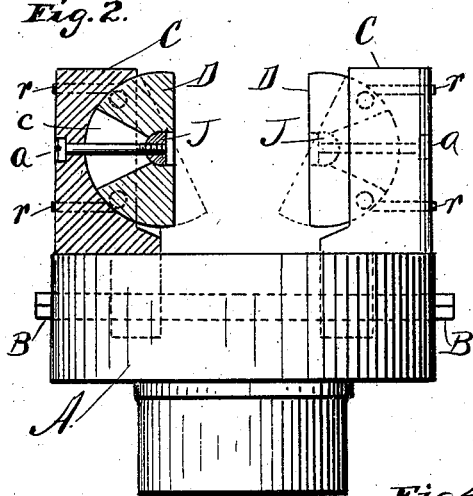
Fig. 2.
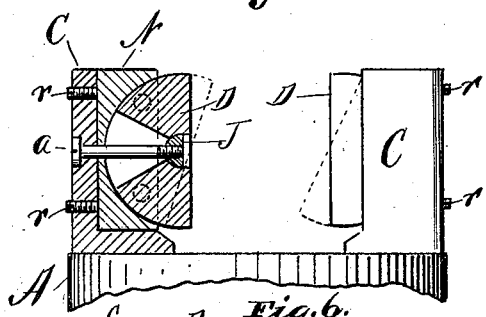
Fig. 6.
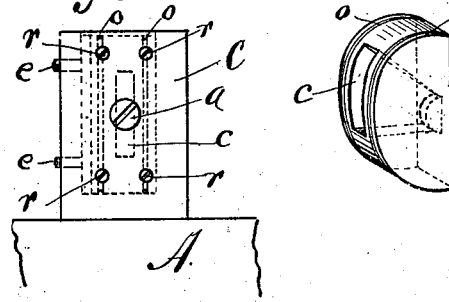
Fig. 3.
Fig. 4.
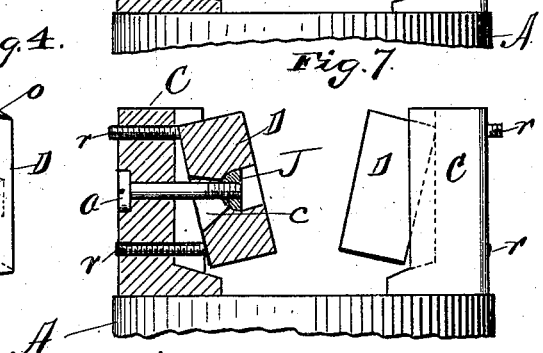
Fig. 7.
Fig. 8.
Witnesses.
Wm. Prell
M. E. Cleveland
Inventor.
Owen F. Garvey.
By Arnold + Barlow
Attorneys.

UNITED STATES PATENT OFFICE.

OWEN FRANCIS GARVEY, OF PROVIDENCE, RHODE ISLAND.

AUTOMATIC MACHINE-CHUCK.

SPECIFICATION forming part of Letters Patent No. 652,961, dated July 3, 1900.

Application filed December 29, 1899. Serial No. 741,935. (No model.)

*To all whom it may concern:*

Be it known that I, OWEN FRANCIS GARVEY, of Providence, in the county of Providence and State of Rhode Island, have invented certain new and useful Improvements in Automatic Machine-Chucks; and I do hereby declare that the following is a full, clear, and exact description thereof, reference being had to the accompanying drawings, and to the letters of reference marked thereon, which form a part of this specification.

This invention relates to that class of machine-tools used on lathes to hold the work for drilling and turning. It is fully explained and illustrated in this specification and the accompanying drawings.

Figure 1 represents a face view of a chuck with the improvement. Fig. 2 is a side view of a chuck with one of the jaws with the improvement in section. Fig. 3 shows a top view of one of the jaws as seen when the chuck is on the lathe. Fig. 4 is a perspective view of one of the holding-blocks separate from the jaw. Fig. 5 shows a face view of the chuck as modified in Fig. 6. Fig. 6 shows a modification of the chuck-jaw, in which a set-off block for eccentric chucking is used. Fig. 7 shows a modification of the shape of the holding-block. Fig. 8 is the same as Fig. 7, with the holding-block in a different position.

The object of this invention is to so construct the holding parts of the jaws of the chuck that they may be set to accommodate pieces of work that are tapering in shape or to hold work with parallel sides in an inclined position and also capable of being used as a concentric or an eccentric chuck, as the nature of the work may require.

The construction and operation of this improvement are as follows:

In the drawings, A is one of the forms of the universal chuck, of which C C are the jaws, that are moved toward or from each other by means of the screw B, which usually has a right-hand thread made on half of its length and a left-hand thread on the other half. In the face of each jaw C a semicircular recess is made (see Fig. 2) of the proper shape to receive the holding-block D. (Shown in Fig. 4.) The block D has a small recess of the same shape as that in the jaw made in its plane face, into which a semicircular block or nut J is fitted, and a screw $a$ is put in through a slot $c$ in the jaw C, which is fitted to screw into the nut J and hold the larger block C in the recess in the jaw, and it will easily be seen that by loosening the screw $a$ a little the holding-block D can be set at an angle to the axis of the chuck, as shown by the dotted line in Fig. 2, and as the two jaws are of like construction by setting both jaws of Fig. 2 at an angle a tapering piece of work can be held in the chuck and by setting the two opposite jaws with their faces parallel, as shown by the dotted lines in Fig. 6, a piece of work with parallel faces may be held inclined, so that a hole can be drilled in it at an angle to its sides.

So far the description has been for use as a concentric chuck, the center of the face of each holding-block C of a pair being supposed to be equal in distance from the axis of the chuck and to maintain that equality when moved out or in by the screw B. To bring one of the jaws nearer the center of the chuck than the other one, four screws $r\ r$ are fitted to screw through the top of the jaw C and have their inner ends bear on the inner surface of the block D, (see Fig. 2,) in which semicircular grooves $o\ o$, Fig. 4, are made to receive them; or, if preferred, a rest-block N, having the semicircular recess for the holding-block, (see Fig. 6,) may be placed between that block and the jaw C to receive the thrust of the screws $r\ r$. Then by loosening the screw $a$ the block D may be pushed in nearer the center than the block in the opposite jaw. The recess in the jaw C may be made rectangular and the holding-block D of the same shape and depend on the screws $r\ r$ entirely for support, as shown in Figs. 7 and 8, and the mode of operation and the effect will be the same as with the semicircular block. A gib $i$ is placed between the block D and the side of the recess in the jaw, with screws $e\ e$ (see Figs. 1 and 2) in the jaw to press on the gib and take up the wear in the usual way. The operation of the chuck may easily be seen from this description, and by loosening the screws $a\ a$ the two holding-blocks C C may be set at almost any angle to each other and then tightened up again, so as to hold almost anyshaped piece of work in various positions when the two jaws are drawn together by the screw B.

Having thus described my improvements, I claim as my invention and desire to secure by Letters Patent—

1. In a chuck the combination of two opposite movable jaws, each jaw carrying a holding-block with flat sides and having a recess in its face, a nut fitted to move in each recess, a screw passing through each jaw and holding-block and screwing into the nut, a slot in each block to admit of its moving on its screw, substantially as described.

2. In a chuck the combination of two opposite movable jaws having recesses with flat sides in their faces, holding-blocks fitted to move in said recesses, screws in the sides of said jaws to tighten or adjust said holding-blocks laterally, recesses in the faces of the holding-blocks, nuts fitted to move in the recesses in the holding-blocks, screws passing through the jaws and blocks and screwing into the nuts, slots in the holding-blocks to allow them to move on the latter screws, substantially as described.

3. The combination of a chuck-jaw having a recess in its face, a holding-block fitted to move in said recess, and having a recess in its working face, a nut movably held in said recess in the block, a screw passing through the jaw and block and screwing into the nut, an opening in said block to allow it to move on the screw, and set-screws in the top of the jaw bearing against said block, substantially as described.

In testimony whereof I have hereunto set my hand this 27th day of December, A. D. 1899.

OWEN FRANCIS GARVEY.

In presence of—
 H. E. BARLOW,
 BENJ. ARNOLD.